US012703571B2

(12) United States Patent
Kawaguchi et al.

(10) Patent No.: US 12,703,571 B2
(45) Date of Patent: Aug. 11, 2026

(54) MOVING BODY

(71) Applicant: FUJI CORPORATION, Chiryu (JP)

(72) Inventors: Koji Kawaguchi, Kasugai (JP); Daniel Brown, Nagoya (JP); Hisato Sawanami, Kariya (JP); Shohei Shiraki, Toyota (JP)

(73) Assignee: FUJI CORPORATION, Chiryu (JP)

( * ) Notice: Subject to any disclaimer, the term of this patent is extended or adjusted under 35 U.S.C. 154(b) by 361 days.

(21) Appl. No.: 18/553,599

(22) PCT Filed: Apr. 5, 2021

(86) PCT No.: PCT/JP2021/014493
§ 371 (c)(1),
(2) Date: Oct. 2, 2023

(87) PCT Pub. No.: WO2022/215115
PCT Pub. Date: Oct. 13, 2022

(65) Prior Publication Data

US 2024/0051751 A1 Feb. 15, 2024

(51) Int. Cl.
*B65G 1/04* (2006.01)
*B60P 1/02* (2006.01)
*B65G 1/02* (2006.01)

(52) U.S. Cl.
CPC ............ *B65G 1/0492* (2013.01); *B60P 1/025* (2013.01); *B65G 1/026* (2013.01)

(58) Field of Classification Search
CPC .... B65G 1/0492; B65G 1/026; B65G 1/0471; B65G 1/065; B65G 1/1375; B65G 67/02; B65G 1/1378; B65G 9/008; B60P 1/025
USPC .......................................................... 414/273
See application file for complete search history.

(56) References Cited

U.S. PATENT DOCUMENTS 10,077,176 B2 * 9/2018 Herre .................. G05D 1/0246
10,202,061 B2 * 2/2019 Scherle .................. B62D 63/02
2003/0184071 A1 * 10/2003 Tokumaru ............. B62D 57/04 280/758
2006/0210382 A1 * 9/2006 Mountz ..................... B60P 1/64 414/498

(Continued)

FOREIGN PATENT DOCUMENTS

CN 111665829 A 9/2020
JP 3-91416 U 9/1991

(Continued)

OTHER PUBLICATIONS

International Search Report issued Jun. 22, 2021 in PCT/JP2021/014493 filed on Apr. 5, 2021, 5 pages.

*Primary Examiner* — Sameh Tawfik
(74) *Attorney, Agent, or Firm* — Oblon, McClelland, Maier & Neustadt, L.L.P.

(57) ABSTRACT

A moving body of the present disclosure is a moving body for placing a loading object on a loading platform and transporting the loading object, and the moving body includes a driving device configured to move the moving body, and a control device configured to set at least one of speed and acceleration/deceleration of the moving body based on a parameter related to at least one of a mass, a size, a shape, and a center of gravity of the loading object, and control the driving device based on at least one of the set speed and acceleration/deceleration.

10 Claims, 6 Drawing Sheets

(56) References Cited

U.S. PATENT DOCUMENTS

| | | | | |
|---|---|---|---|---|
| 2008/0166217 | A1* | 7/2008 | Fontana | B66F 9/063<br>414/800 |
| 2018/0141752 | A1 | 5/2018 | Nakanishi et al. | |
| 2019/0283252 | A1 | 9/2019 | Skaaksrud et al. | |
| 2019/0285589 | A1 | 9/2019 | Hirao et al. | |
| 2023/0012915 | A1* | 1/2023 | Camboni | B65G 1/0435 |
| 2025/0108974 | A1* | 4/2025 | Penalba Garcia | B65G 1/0471 |
| 2025/0178834 | A1* | 6/2025 | Wagner | B65G 67/02 |
| 2025/0187039 | A1* | 6/2025 | Hyslop | B07C 5/362 |

FOREIGN PATENT DOCUMENTS

| | | | |
|---|---|---|---|
| JP | 5-14090 | U | 2/1993 |
| JP | 2011-175369 | A | 9/2011 |
| JP | 2018-34932 | A | 3/2018 |
| JP | 2019-164111 | A | 9/2019 |
| KR | 10-2018-0042975 | A | 4/2018 |
| WO | WO 2016/181627 | A1 | 11/2016 |

* cited by examiner

MOVING BODY

TECHNICAL FIELD

The present description discloses a moving body.

BACKGROUND ART

Conventionally, a delivery system using an automatic moving vehicle capable of placing a wheeled platform on a loading platform has been known. For example, Patent Literature 1 has proposed that an automatic moving vehicle enters a lower portion of a wheeled platform with a caster, loads the wheeled platform on a loading platform, and moves automatically. (For example, refer to Patent Literature 1).

PATENT LITERATURE

Patent Literature 1: U.S. Pat. No. 10,202,061

BRIEF SUMMARY

Technical Problem

However, in such an automatic moving vehicle, when performing high speed traveling in a state in which an object having a large mass is placed on a loading platform, it may be difficult to avoid danger. Meanwhile, when an object with a small mass is continuously traveled at a low speed in a state of being placed on a loading platform, a movement time may be lengthened.

The present disclosure has been made to solve such problems, and an object thereof is to move a moving body at an appropriate speed or acceleration/deceleration.

Solution to Problem

According to a first aspect of the present disclosure, there is provided a moving body for placing a loading object on a loading platform and transporting the loading object, the moving body including: a driving device configured to move the moving body; and a control device configured to set at least one of speed and acceleration/deceleration of the moving body based on a parameter related to at least one of a mass, a size, a shape, and a center of gravity of the loading object, and control the driving device based on at least one of the set speed and the set acceleration/deceleration.

In the moving body, at least one of the speed and the acceleration/deceleration of the moving body is set based on the parameter related to at least one of the mass, the size, the shape, and the center of gravity of the loading object, and the driving device is controlled based on at least one of the set speed and the set acceleration/deceleration. In other words, it is possible to move the moving body at a speed or an acceleration/deceleration suitable for the loading object. Therefore, it is possible to avoid making it difficult to avoid danger or making a movement time longer.

According to a second aspect of the present disclosure, there is provided a moving body for placing a loading object on a loading platform and transporting the loading object, the moving body including: a driving device configured to move the moving body; and a loading platform lifting and lowering device configured to lift and lower the loading platform, in which the control device acquires a parameter related to at least one of a mass, a size, a shape, and a center of gravity of the loading object when the loading platform lifting and lowering device lifts the loading platform on which the loading object is placed.

In this moving body, when the loading platform lifting and lowering device lifts the loading platform on which the loading object is placed, the control device acquires the parameter related to at least one of the mass, the size, the shape, and the center of gravity of the loading object. The parameter can be easily acquired when the loading platform on which the loading object is placed is lifted. Therefore, the control device can relatively easily acquire the parameter.

According to a third aspect of the present disclosure, there is provided a moving body placing a loading object on a loading platform and transporting the loading object, the moving body including: a loading platform lifting and lowering device configured to lift and lower the loading platform; and a positioning member configured to not protrude from an upper surface of the loading platform when the loading platform is not lifted by the loading platform lifting and lowering device and to protrude from the upper surface of the loading platform when the loading platform is lifted by the loading platform lifting and lowering device to position the loading object placed on the loading platform.

In this moving body, since the positioning member does not protrude from the upper surface of the loading platform when the loading platform is not lifted by the loading platform lifting and lowering device, there is no possibility that the positioning member is caught by anything. In addition, since the positioning member protrudes from the upper surface of the loading platform to position the loading object placed on the loading platform when the loading platform is lifted by the loading platform lifting and lowering device, it is possible to limit movement of the loading object on the loading platform during transportation. It should be noted that the expression "does not protrude from the upper surface of the loading platform" includes a case where the positioning member does not protrude at all from the upper surface of the loading platform, and a case where the positioning member protrudes slightly (for example, 1 mm or 2 mm) from the upper surface of the loading platform to an extent that the positioning member is not caught by anything.

DESCRIPTION OF EMBODIMENTS

Figure 1:
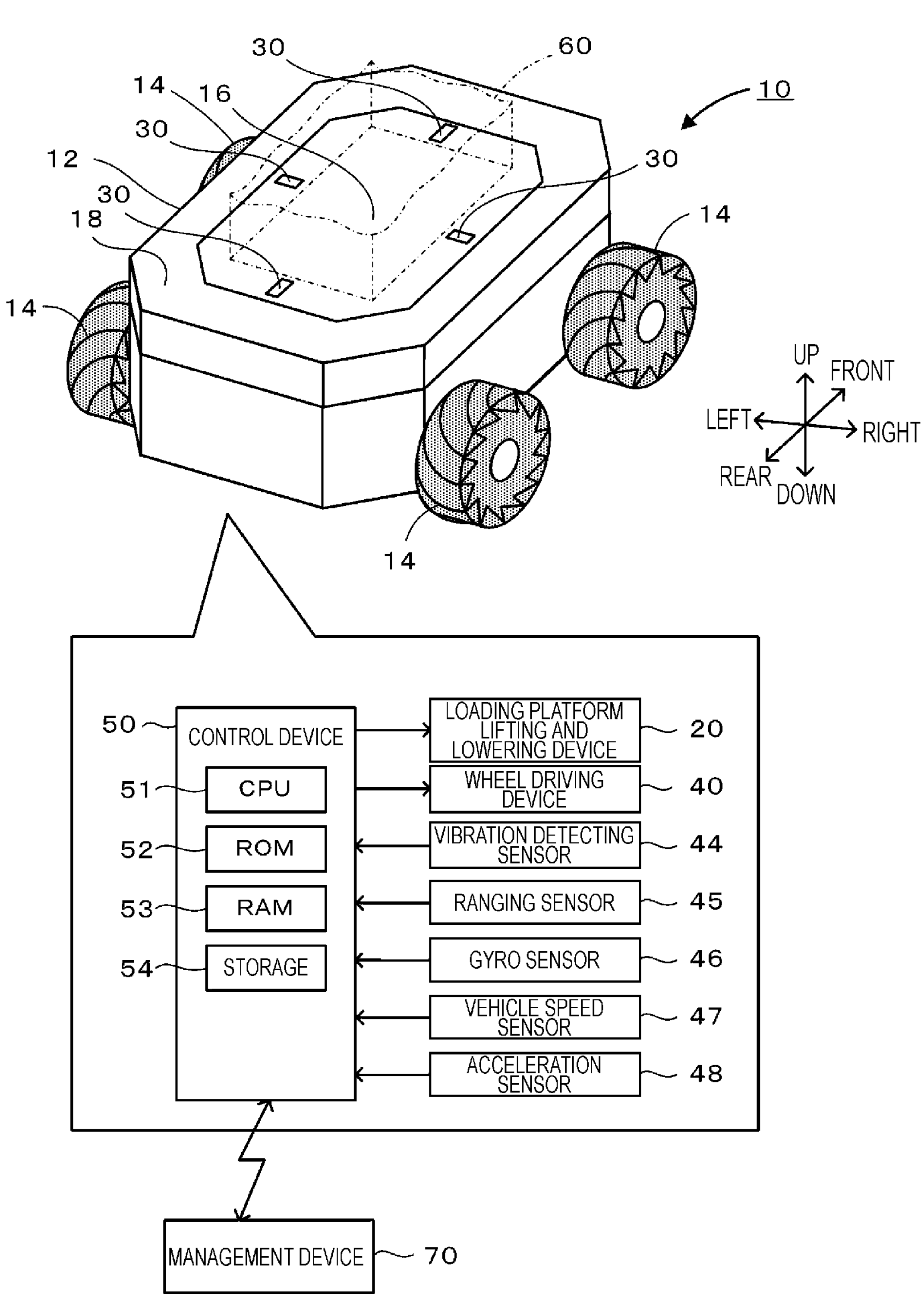
FIG. 1 is a perspective view illustrating a schematic configuration of moving body 10.
Figure 2:
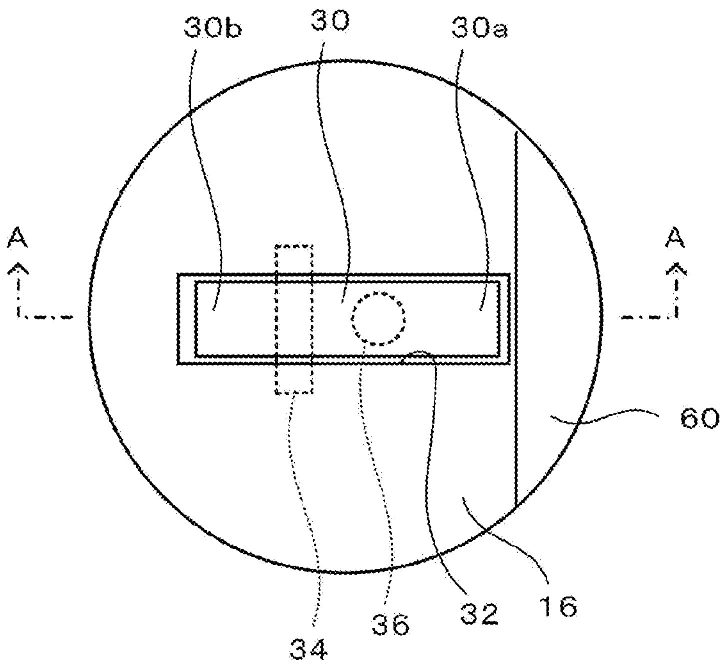
FIG. 2 is a plan view of positioning member 30 provided on a left side of loading platform 16.
Figure 3:
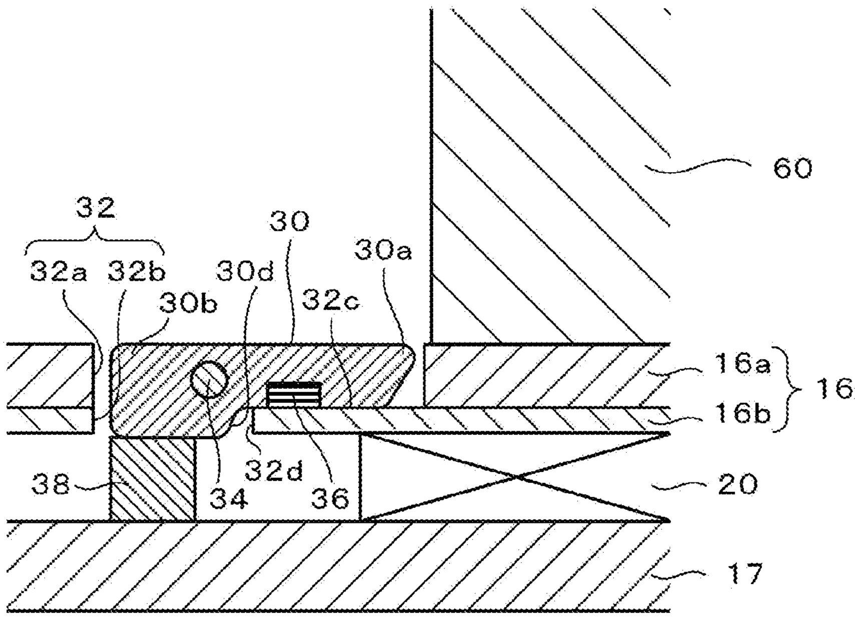
FIG. 3 is a cross-sectional view taken along line A-A in FIG. 2.
Figure 4:
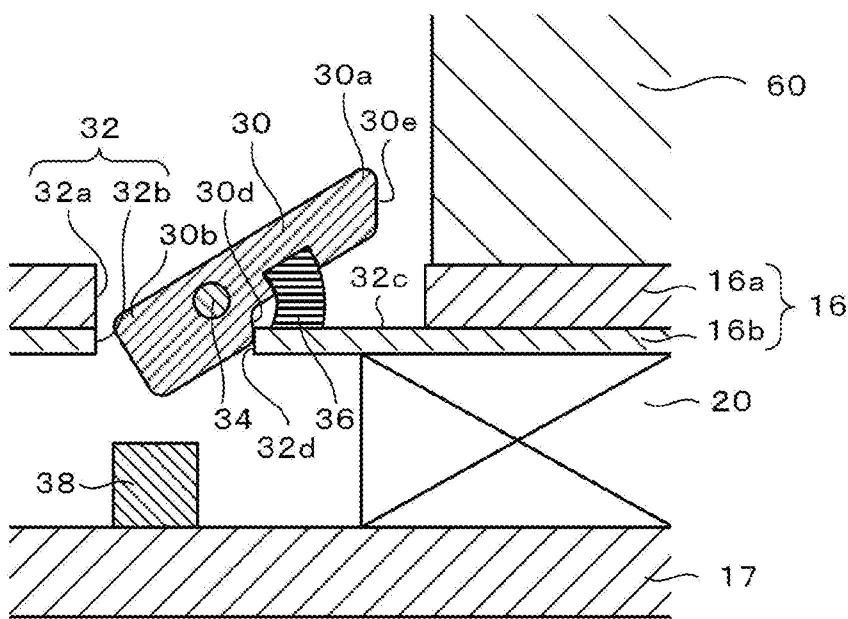
FIG. 4 is a longitudinal sectional view of positioning member 30 when loading platform 16 is in an upper position.

Embodiments according to the present disclosure will be described with reference to the drawings. FIG. 1 is a perspective view illustrating a schematic configuration of moving body 10, FIG. 2 is a plan view of positioning member 30 provided on a left side of loading platform 16, FIG. 3 is a cross-sectional view (longitudinal sectional view of positioning member 30 when loading platform 16 is in a lower position) taken along line A-A of FIG. 2, and FIG. 4 is a longitudinal sectional view of positioning member 30 when loading platform 16 is in the lower position. It should be noted that FIG. 1 also illustrates a block diagram illustrating electrical connection of moving body 10. In addition, in the present embodiment, a left-right direction, a front-rear direction, and an up-down direction are described as illustrated in FIG. 1.

Moving body 10 is a self-propelled vehicle in which four mecanum wheels 14 are attached to the left-right and the front-rear of vehicle body 12. Moving body 10 is configured as an Autonomous Mobile Robot (AMR) that moves by detecting the surroundings.

Moving body 10 includes loading platform 16, loading platform lifting and lowering device 20, positioning member 30, wheel driving device 40, vibration detecting sensor 44, ranging sensor 45, gyro sensor 46, vehicle speed sensor 47, acceleration sensor 48, and control device 50.

Loading platform 16 is provided on a upper surface of vehicle body 12. Loading object 60 is loaded on loading platform 16. Loading platform 16 is flush with annular surface 18 around loading platform 16 in a state (a state where loading platform is at the lower position) in which loading platform is not lifted by loading platform lifting and lowering device 20. As illustrated in FIG. 3, loading platform 16 has a structure in which upper horizontal plate 16*a* and lower horizontal plate 16*b* are laminated.

loading platform lifting and lowering device 20 is disposed below loading platform 16 of vehicle body 12, and lifts and lowers loading platform 16 by expanding and contracting a rod (not illustrated) by a lifting and lowering motor (not illustrated).

As illustrated in FIG. 3, positioning member 30 is a claw-like member having distal end 30*a* and proximal end 30*b*, and is disposed in rectangular housing groove 32 provided on the upper surface of loading platform 16. It should be noted that positioning member 30 illustrated in FIG. 3 is provided on a left side of loading platform 16 in FIG. 1. Housing groove 32 includes upper groove 32*a* that penetrates upper horizontal plate 16*a* in the up-down direction, and lower groove 32*b* that penetrates lower horizontal plate 16*b* in the up-down direction. A length of lower groove 32*b* in a lateral direction is equal to a length of upper groove 32*a* in the lateral direction, but a length of lower groove 32*b* in a longitudinal direction is shorter than a length of upper groove 32*a* in the longitudinal direction. Therefore, when upper groove 32*a* is viewed from above, a portion of lower horizontal plate 16*b* where lower groove 32*b* is not provided is visually recognized, but this portion is referred to as groove bottom surface 32*c*. Positioning member 30 is pivotably supported by horizontal fulcrum pin 34 provided in housing groove 32. Fulcrum pin 34 is attached to the vicinity of the center of positioning member 30. Spring 36 as a biasing member is attached between distal end 30*a* of positioning member 30 and groove bottom surface 32*c*. Spring 36 biases distal end 30*a* of positioning member 30 upward. In other words, spring 36 biases positioning member 30 in the counterclockwise direction about fulcrum pin 34. Vehicle body 12 is provided with base section 17 that cannot be moved up and down below loading platform 16. Base section 17 is provided so as not to be lifted and lowered by loading platform lifting and lowering device 20. Columnar protrusion 38 serving as an adjustment member is provided on an upper surface of base section 17.

In a state in which loading platform 16 is not lifted by loading platform lifting and lowering device 20 (a state in which loading platform 16 is in the lower position), as illustrated in FIG. 3, protrusion 38 is in contact with proximal end 30*b* of positioning member 30 and presses proximal end 30*b* upward. As a result, distal end 30*a* of positioning member 30 is housed in housing groove 32 against the biasing force of spring 36, and does not protrude from the upper surface of loading platform 16. As described above, protrusion 38 restrains the upper surface of positioning member 30 from protruding from the upper surface of loading platform 16 when loading platform 16 is in the lower position. In the present embodiment, the upper surface of positioning member 30 at this time is flush with the upper surface of loading platform 16.

In a state in which loading platform 16 is lifted by loading platform lifting and lowering device 20 (a state in which loading platform 16 is in the upper position), proximal end 30*b* of positioning member 30 is separated from protrusion 38 as illustrated in FIG. 4. Therefore, protrusion 38 is in a state in which proximal end 30*b* of positioning member 30 is not pressed upward. As a result, distal end 30*a* of positioning member 30 protrudes from the upper surface of loading platform 16 by the biasing force of spring 36. Positioning member 30 is positioned in a state in which step 30*d* provided on the rear surface of positioning member 30 abuts on opening edge 32*d* (stopper) of lower groove 32*b*. As such, protrusion 38 allows distal end 30*a* of positioning member 30 to protrude from the upper surface of loading platform 16 when loading platform 16 is in the upper position. At this time, tip surface 30*e* of positioning member 30 is substantially perpendicular to the upper surface of loading platform 16. Even when loading object 60 placed on loading platform 16 is displaced and loading object 60 abuts on positioning member 30, positioning member 30 can receive loading object 60 and stop loading object 60.

Wheel driving device 40 is a motor for driving moving body 10 by independently driving four mecanum wheels 14 in rotation. Mecanum wheel 14 has a structure in which multiple rollers supported so as to be freely rotatable by an inclination of 45° with respect to an axle are provided on a grounding surface side. In moving body 10, each of mecanum wheels 14 is independently rotated in a front direction or a rear direction, so that moving body 10 can move in all directions and perform spin turn, pivot turn, power turn, and the like.

Vibration detecting sensor 44 detects a vibration frequency generated when moving body 10 moves. Ranging sensor 45 detects an object, a failure, and a distance existing in the vicinity of moving body 10. Gyro sensor 46 detects a vehicle body direction and an arrangement angle of moving body 10. Vehicle speed sensor 47 detects a speed at which moving body 10 moves. Acceleration sensor 48 detects an acceleration when moving body 10 moves.

Control device 50 is a general-purpose computer including CPU 51, ROM 52, RAM 53, storage 54, and the like. CPU 51 executes various kinds of processing. ROM 52 stores a processing program and the like. RAM 53 is a work area for temporarily storing data and the like. Storage 54 is a storage area for storing data, files, and the like such that the data, the files and the like are readable therefrom. Signals from vibration detecting sensor 44, ranging sensor 45, gyro sensor 46, vehicle speed sensor 47, and acceleration sensor 48 are inputted to control device 50. Control device 50 outputs a drive signal to wheel driving device 40, a lifting and lowering signal to loading platform lifting and lowering device 20, and the like. Control device 50 is communicably connected to management device 70 for managing moving body 10.

Figure 5:
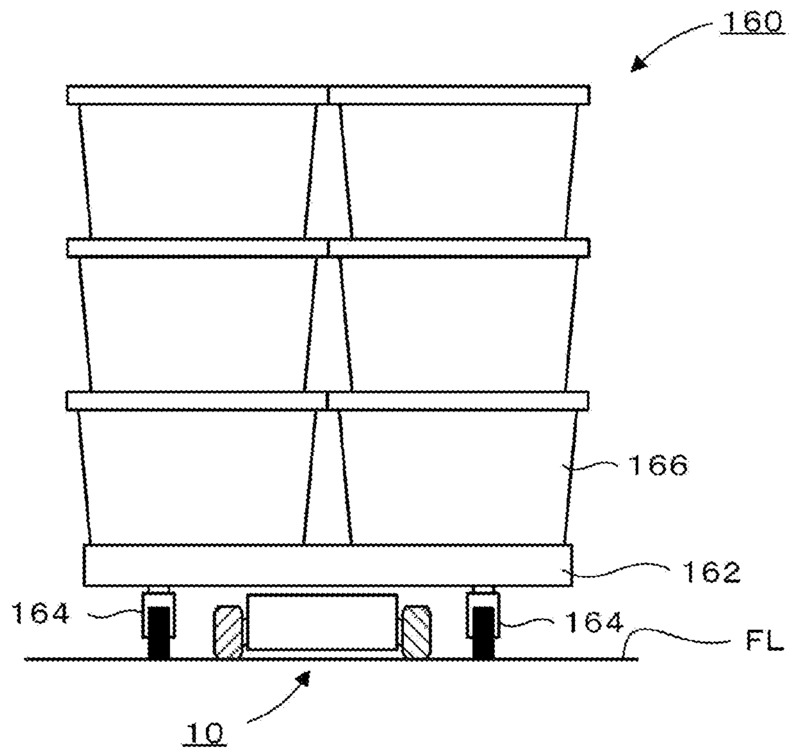
FIG. 5 is an explanatory view illustrating a state when moving body 10 is submerged below wheeled platform 160.
Figure 6:
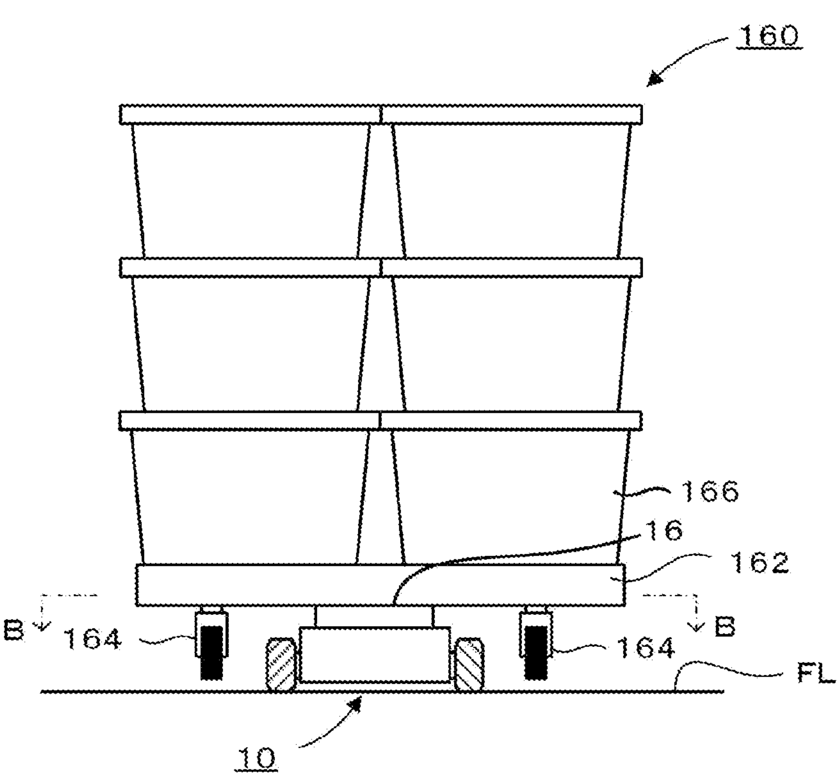
FIG. 6 is an explanatory view illustrating a state when wheeled platform 160 is placed on loading platform 16 and lifted.
Figure 7:
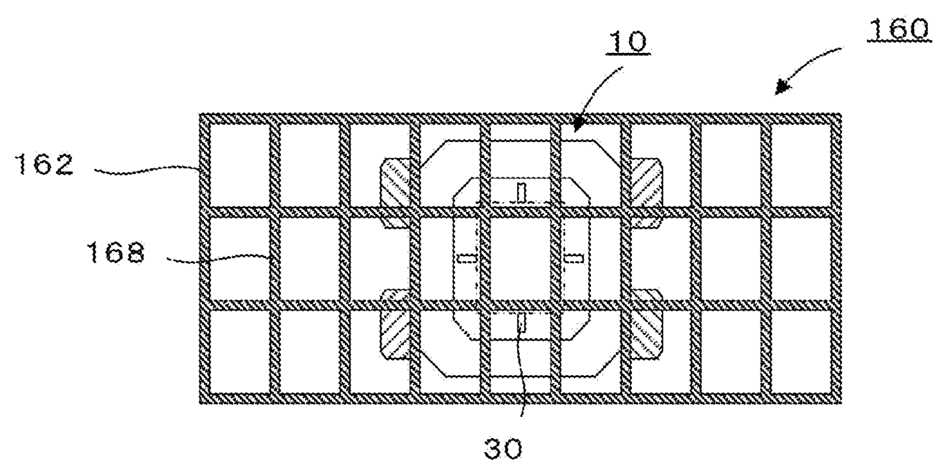
FIG. 7 is a cross-sectional view taken along line B-B in FIG. 6.

Next, an example of using moving body 10 will be described. FIG. 5 is an explanatory view illustrating a state when moving body 10 is submerged below wheeled platform 160, FIG. 6 is an explanatory view illustrating a state when wheeled platform 160 is placed on loading platform 16 and lifted, and FIG. 7 is a cross-sectional view taken along line B-B in FIG. 6. Here, a case will be described in which moving body 10 is submerged below wheeled platform 160 serving as loading object 60, places wheeled platform 160 on loading platform 16, and then conveys the loading object to a predetermined target position.

As illustrated in FIG. 5, in wheeled platform 160, wheels 164 are attached to four corners of plate-shaped placing table 162. Multiple baskets 166 filled with cargo are placed on placing table 162. Although an upper surface of placing table 162 is flat, reinforcing rib 168 is provided on a lower surface of placing table 162 in the vertical and horizontal directions. A space is formed between placing table 162 and floor surface FL. This space is large enough to allow moving body 10 in a state in which loading platform 16 is disposed at the lower position to sink. The lower surface of placing table 162 is divided into multiple squares by such ribs 168 (refer to FIG. 7). When receiving the position information of wheeled platform 160 from management device 70, moving body 10 moves based on the position information and sinks under wheeled platform 160 in a state in which loading platform 16 is disposed at the lower position. At this time, when positioning member 30 protrudes from the upper surface of loading platform 16, there is a possibility that positioning member 30 is caught by the lower surface of wheeled platform 160, but since positioning member 30 does not protrude from the upper surface of loading platform 16 when loading platform 16 is in the lower position, there is no such possibility.

Figure 8:
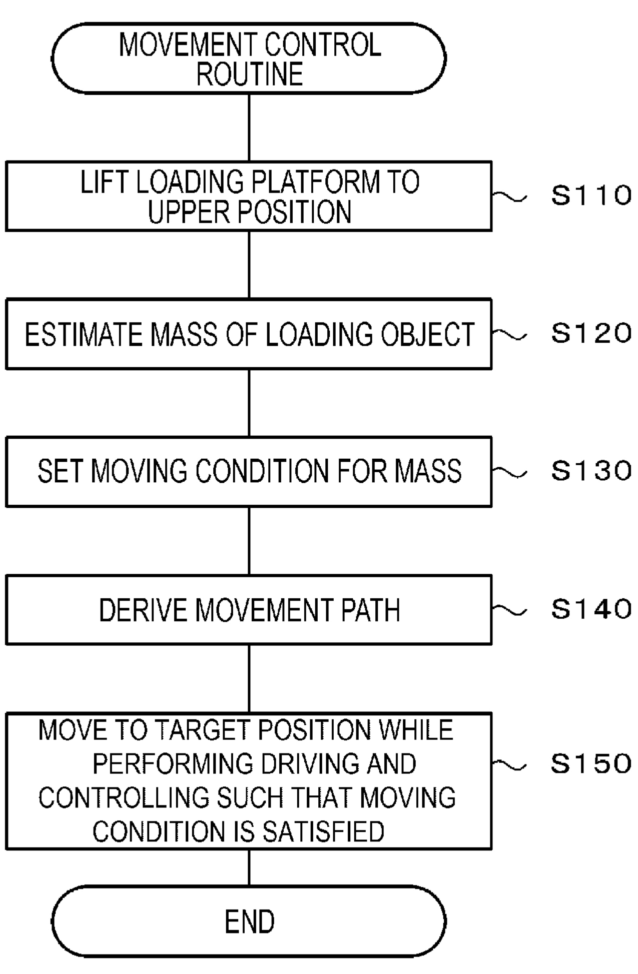
FIG. 8 is a flowchart of a movement control routine.

In this state, CPU 51 of control device 50 executes a movement control routine. FIG. 8 is a flowchart of the movement control routine. A program of the movement control routine is stored in ROM 52 of control device 50.

When the movement control routine starts, CPU 51 of control device 50 first controls loading platform lifting and lowering device 20 to lift loading platform 16 to the upper position (S110), and estimates the mass of loading object 60 based on a feedback value of current flowing through the lifting and lowering motor (not illustrated) of loading platform lifting and lowering device 20 at that time (S120). Loading platform 16 comes into contact with loading object 60 while being lifted to the upper position, and then rises together with loading object 60 to the upper position. As the mass of loading object 60 increases, a load torque of the lifting and lowering motor (not illustrated) of loading platform lifting and lowering device 20 increases, and a feedback value of the current flowing through the lifting and lowering motor increases. Therefore, it is possible to estimate the mass of loading object 60 based on the feedback value of the current flowing through the lifting and lowering motor. In this case, since loading object 60 is wheeled platform 160, loading platform 16 on which wheeled platform 160 is placed is lifted to the upper position as illustrated in FIG. 6. When loading platform 16 is lifted to the upper position, distal end 30*a* of positioning member 30 rises as illustrated in FIGS. 3 to 4. At this time, four positioning members 30 surround rib 168 forming a central rectangle (refer to chain line in FIG. 7) of placing table 162. Therefore, wheeled platform 160 is positioned by four positioning members 30.

CPU 51 then sets a moving condition for the mass (S130). A table indicating a correspondence between the mass and the moving condition is stored in advance in storage 54, so that CPU 51 sets the moving condition with reference to the table. Specifically, in the table, as illustrated in Table 1, acceleration and a maximum speed are determined in association with the light weight of the mass. In Table 1, the mass is divided into three types of "light", "medium", and "heavy", but "light" is set such that the mass is less than X [kg], "medium" is set such that the mass is equal to or more than X [kg] and less than Y [kg] (where X<Y), and "heavy" is set such that the mass is equal to or more than Y [kg]. The acceleration is divided into three types of "low", "medium", and "high", but "low" is set such that an absolute value of the acceleration is equal to or less than A [$m/s^2$], "medium" is set such that the absolute value of the acceleration is equal to or less than B [$m/s^2$], and "high" is set such that the absolute value of the acceleration is equal to or less than C [$m/s^2$] (where A<B<C). The maximum speed is also divided into three types of "low", "medium", and "high", but "low" is set such that the maximum speed is P [m/s], "medium" is set such that the maximum speed is Q [m/s], and "high" is set such that the maximum speed is R [m/s] (where P<Q<R).

TABLE 1

| | Moving condition | |
|---|---|---|
| Weight | Acceleration | Maximum speed |
| Heavy | Low | Low |
| Medium | Medium | Medium |
| Light | High | High |

Next, CPU 51 derives a movement path from an initial position to a predetermined target position based on an initial position where loading object 60 is disposed and the target position (S140). Specifically, moving body 10 generates an environment map or estimates its own position by the SLAM, and derives the movement path connecting the initial position and the target position based on the environment map or the own position.

Next, CPU 51 inputs the speed and the acceleration/deceleration from vehicle speed sensor 47 and acceleration sensor 48, moves moving body 10 to the target position along the derived movement path while controlling wheel driving device 40 such that the moving condition set this time is satisfied (S150), and then ends the present routine. As a result, wheeled platform 160 arranged at the initial position is conveyed to the target position.

In moving body 10 described above, the speed and the acceleration/deceleration of moving body 10 are set based on the mass of loading object 60, and wheel driving device 40 is controlled based on the set speed and the set acceleration/deceleration. In other words, moving body 10 is moved at a speed or an acceleration/deceleration suitable for the mass of loading object 60. Therefore, it is possible to avoid making it difficult to avoid danger or making a movement time longer. Specifically, when the mass of loading object 60 is light, the acceleration and the maximum speed are also set high, so that it arrives at the target position in a short time. In this case, since the mass is light, the danger can be relatively easily avoided even when the acceleration or the maximum speed is high. Meanwhile, when the mass of loading object 60 is heavy, since the acceleration and the maximum speed are also set to be low, it cannot be arrived at the target position in a short time, but it is not difficult to avoid the danger.

In addition, since the driving motor and the battery of wheel driving device 40 can be downsized, it is possible to contribute to low cost and energy saving.

Further, when loading platform lifting and lowering device 20 lifts loading platform 16 on which loading object 60 is placed, control device 50 acquires the mass of loading object 60. The mass of loading object 60 can be easily acquired when loading platform 16 on which loading object 60 is placed is lifted. Therefore, control device 50 can relatively easily acquire the mass.

Furthermore, since positioning member 30 does not protrude from the upper surface of loading platform 16 when loading platform 16 is not lifted by loading platform lifting and lowering device 20, there is no possibility that positioning member 30 is caught by anything. In addition, since positioning member 30 positions loading object 60 that protrudes from the upper surface of loading platform 16 and is placed on loading platform 16 when loading platform 16 is lifted by loading platform lifting and lowering device 20, it is possible to limit the movement of loading object 60 on loading platform 16 during transportation.

Positioning member 30 is pivotably supported by fulcrum pin 34 and is operated by spring 36 and protrusion 38. Spring 36 biases distal end 30*a* of positioning member 30 upward. Protrusion 38 is provided on base section 17 which is a non-lifting and lowering section which is not lifted and lowered by loading platform lifting and lowering device 20. Protrusion 38 restrains distal end 30*a* of positioning member 30 from protruding from the upper surface of loading platform 16 by pressing proximal end 30*b* of positioning member 30 upward when loading platform 16 is not lifted by loading platform lifting and lowering device 20. Protrusion 38 releases proximal end 30*b* of positioning member 30 from being pressed upward when loading platform 16 is lifted by loading platform lifting and lowering device 20 to allow distal end 30*a* of positioning member 30 to protrude from the upper surface of loading platform 16 by the biasing of spring 36. Therefore, it is possible to operate positioning member 30 with a relatively simple configuration.

In addition, positioning member 30 causes distal end 30*a* of positioning member 30 to protrude from the upper surface of loading platform 16 by the biasing of spring 36 when loading platform 16 is lifted by loading platform lifting and lowering device 20 and positioning member 30 comes into contact with opening edge 32*d* of lower groove 32*b* serving as a stopper at a time point when the protrusion height reaches a predetermined height to prevent from being further pivoted further. Therefore, it is possible to maintain the attitude of positioning member 30 for positioning loading object 60. In addition, even when loading object 60 placed on loading platform 16 is displaced and loading object 60 abuts on positioning member 30, positioning member 30 can receive loading object 60 and stop loading object 60.

The present disclosure is not limited in any way to the embodiment that has been described heretofore, and hence, needless to say, the present disclosure can be carried out in various forms without departing from the technical scope of the present disclosure.

For example, in the above embodiment, the mass of loading object 60 is estimated based on a feedback value of current flowing through the lifting and lowering motor of loading platform lifting and lowering device 20, but is not particularly limited to this. For example, a mass detection sensor may be attached to loading platform 16, and control device 50 may input the mass of loading object 60 detected by the mass detection sensor. Alternatively, when management device 70 stores the mass of loading object 60 in advance, control device 50 of moving body 10 may acquire the mass of loading object 60 from management device 70. In particular, in a case where moving body 10 does not include loading platform lifting and lowering device 20, the mass may be detected using the mass detection sensor or the mass may be acquired from management device 70 in this manner.

Figure 9:
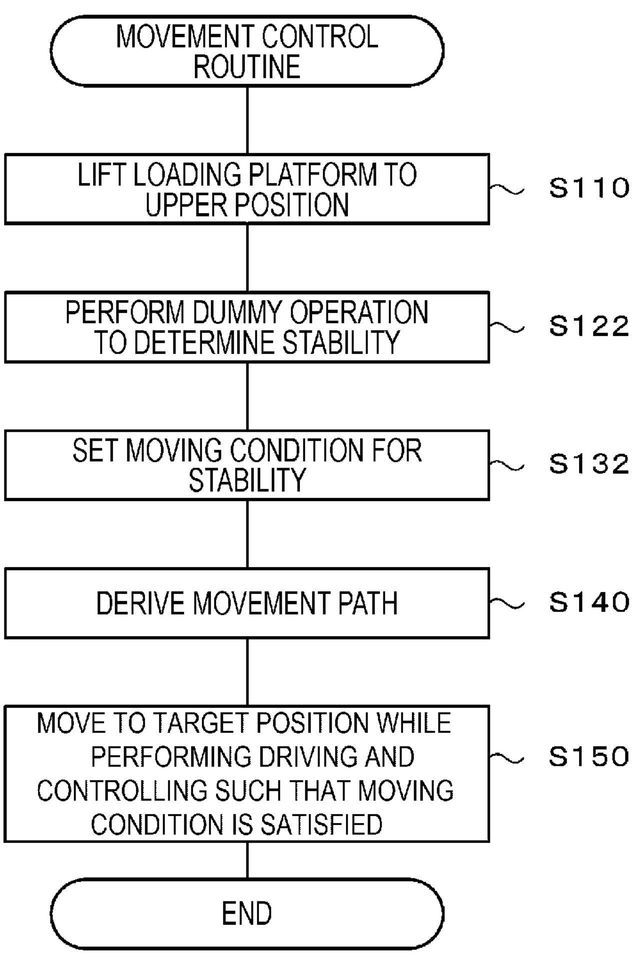
FIG. 9 is a flowchart of another movement control routine.

In the above embodiment, CPU 51 of control device 50 executes the flowchart of the movement control routine in FIG. 8, but may execute a flowchart of a movement control routine in FIG. 9 instead. The movement control routine in FIG. 9 is the same as the movement control routine in FIG. 8 except that S122 and S132 are executed instead of S120 and S130. Therefore, only S122 and S132 will be described below. In S122, CPU 51 performs a dummy operation to determine stability of loading object 60. The dummy operation is an operation of moving the moving body 10 on which loading object 60 is placed at a predetermined low speed a predetermined short distance. CPU 51 inputs a vibration frequency generated when the dummy operation is executed from vibration detecting sensor 44, and determines the stability based on the vibration frequency. In this case, when the vibration frequency is "low", it is determined that the stability is "low", and when the vibration frequency is "high", it is determined that the stability is "high". The vibration frequencies are classified into two types of "low" and "high", and "low" is set such that the frequency is less than K [kHz], and "high" is set such that the frequency is equal to or less than K [kHz].

In subsequent S132, CPU 51 sets a moving condition with respect to the stability. Since a table indicating a correspondence between the stability and the moving condition is stored in advance in storage 54, CPU 51 sets the moving condition with reference to the table. Specifically, as illustrated in Table 2, an acceleration and a maximum speed are determined in association with the high and low levels of the stability. By executing the movement control routine in FIG. 9, moving body 10 can be moved at a speed or an acceleration/deceleration suitable for the stability of loading object 60. In addition, since the stability of loading object 60 is determined based on the vibration data during the dummy operation, the stability can be relatively easily acquired.

TABLE 2

| | Moving condition | |
|---|---|---|
| Stability | Acceleration | Maximum speed |
| Low | Low | Low |
| High | High | High |

It should be noted that CPU 51 may execute the dummy operation in each of an X-direction, a Y-direction, and a Q-direction (rotation direction) in S122, and set the moving condition for each direction in S132. In that case, while moving body 10 moves to the target position, CPU 51 drives and controls wheel driving device 40 such that the moving condition set in the X direction is satisfied if a traveling direction of moving body 10 is the X-direction, drives and controls wheel driving device 40 such that the moving condition set in the Y direction is satisfied if the traveling direction of moving body 10 is the Y-direction, and drives and controls wheel driving device 40 such that the moving condition set in the Q direction is satisfied if the traveling direction of moving body 10 is the Q-direction. As a result, even when the stability of loading object 60 is different for each direction, moving body 10 can be moved at a speed and an acceleration/deceleration suitable for the actual traveling direction.

In the above embodiment, loading platform 16 is positioned in two positions such as the lower position and the upper position, but the upper position may be provided in multiple stages. For example, the upper position may be set to two stages such as a first upper position and a second upper position, and the first upper position may be set to a position higher than the second upper position. After S110 and S120 of the movement control routine, CPU 51 may lower loading platform 16 to the second upper position before starting the movement of moving body 10 in a case where the mass of loading object 60 when loading platform 16 is lifted to the first upper position is heavy (the mass exceeds a threshold). In this way, loading object 60 can be carried in a stable state.

In the above-described embodiment, control device 50 may determine whether the position of the center of gravity of loading object 60 falls within a predetermined appropriate range of loading platform 16, and when the position of the center of gravity does not fall within the appropriate range, lower loading platform 16 to the lower position by loading platform lifting and lowering device 20, and lower loading object 60 from loading platform 16. Thereafter, control device 50 may move moving body 10 such that the position of the center of gravity of loading object 60 falls within a predetermined appropriate range on loading platform 16, then again lift loading platform 16 to the upper position by loading platform lifting and lowering device 20, and place loading object 60 on loading platform 16 to lift loading object 60. As a result, loading object 60 placed on loading platform 16 can be transported in a stable state. In this case, control device 50 may determine whether the position of the center of gravity of loading object 60 falls within a predetermined appropriate range during the movement of moving body 10. In this case, even when the position of the center of gravity of loading object 60 deviates from the appropriate range by an external force (for example, wind) during the movement of moving body 10, loading object 60 is once dropped from loading platform 16, which is preferable for safety. In addition, in the determination performed during the movement of moving body 10, when the position of the center of gravity of loading object 60 does not fall within a predetermined appropriate range, control device 50 may lower loading object 60 from loading platform 16 to cause moving body 10 to wait for a predetermined time, then cause loading object 60 to be placed on loading platform 16 again, so that the determination is performed. In this manner, loading object 60 can be safely transported. It should be noted that the position of the center of gravity of loading object 60 can be physically determined based on the mass detected by each load cell when a load cell is provided in four corners of loading platform 16 and loading object 60 placed on loading platform 16 comes into contact with each load cell. A pressure sensor may be provided in place of the load cell. Alternatively, it may be measured by a centroid position measurement device disclosed in JP-A-2016-194534.

In the above-described embodiment, the moving condition (speed or acceleration/deceleration) of moving body 10 is set based on the mass of loading object 60, but the moving condition of moving body 10 may be set based on at least one of the mass, the size, the shape, and the center of gravity of loading object 60. For example, control device 50 may recognize the mass and the size of loading object 60 based on an image captured by the camera of loading object 60. Alternatively, control device 50 may measure the position of the center of gravity of loading object 60 by the centroid position measurement device. Alternatively, when data such as the mass, the size, the center of gravity, and the like of loading object 60 is stored in advance in management device 70, control device 50 may acquire the data from management device 70.

In the above-described embodiment, when loading platform lifting and lowering device 20 lifts loading platform 16 on which loading object 60 is placed, control device 50 acquires the mass of loading object 60, but the acquisition is not particularly limited to the mass. For example, at least one parameter among the mass, the size, the shape, and the center of gravity of loading object 60 may be acquired.

In the above embodiment, spring 36 is used as the biasing member, but a pair of magnets or the like having the same weight and polarity may be used instead of spring 36. For example, a weight may be applied to proximal end 30*b* side of positioning member 30 such that the weight biases distal end 30*a* of positioning member 30 upward. Alternatively, a magnet of any one polarity of NS may be attached to the rear surface of proximal end 30*b* of positioning member 30, a magnet of the same polarity may be attached at a position facing the magnet of groove bottom surface 32*c*, and distal end 30*a* of positioning member 30 may be biased upward by the repulsive force of the same polarity.

In the above embodiment, moving body 10 is configured as an AMR, but may be configured as an Automated Guided Vehicle (AGV).

INDUSTRIAL APPLICABILITY

The moving body of the present disclosure can be used, for example, for transporting an object.

REFERENCE SIGNS LIST

10: moving body, 12: vehicle body, 14: mecanum wheel, 16: loading platform, 16*a*: upper horizontal plate, 16*b*: lower horizontal plate, 17: base section, 18: annular surface, 20: loading platform lifting and lowering device, 30: positioning member, 30*a*: distal end, 30*b*: proximal end, 30*d*: step, 30*e*: tip surface, 32: housing groove, 32*a*: upper groove, 32*b*: lower groove, 32*c*: groove bottom surface, 32*d*: opening edge, 34: fulcrum pin, 36: spring, 38: protrusion, 40: wheel driving device, 44: vibration detecting sensor, 45: ranging sensor, 46: gyro sensor, 47: vehicle speed sensor, 48: acceleration sensor, 50: control device, 51: CPU, 52: ROM, 53: RAM, 54: storage, 60: loading object, 70: management device, 160: wheeled platform, 162: placing table, 164: wheel, 166: basket, 168: rib

The invention claimed is:

1. A moving body for placing a loading object on a loading platform and transporting the loading object, the moving body comprising:

a driving device configured to move the moving body; and a control device including a processor configured to set at least one of speed and acceleration/deceleration of the moving body based on a parameter related to at least one of a mass, a size, a shape, and a center of gravity of the loading object based on a predetermined relationship, derive a movement path based on an initial position of the moving body and a target position of the moving body, and control the driving device based on at least one of the set speed and the set acceleration/deceleration to move the moving body along the derived movement path.

2. The moving body according to claim 1, wherein the parameter includes the mass of the loading object, and the control device controls the driving device such that at least one of the speed and the acceleration/deceleration of the moving body decreases as the mass of the loading object increases.

3. The moving body according to claim 1, wherein the parameter includes a stability of the loading object, and the control device controls the driving device such that at least one of the speed and the acceleration/deceleration of the moving body decreases as the stability of the loading object decreases.

4. The moving body according to claim 3, wherein the control device determines the stability of the loading object based on vibration data when a dummy operation is performed on the moving body in which the loading object is placed on the loading platform, and controls the driving device such that at least one of the speed and the acceleration/deceleration of the moving body decreases as the stability of the determined loading object decreases.

5. The moving body according to claim 3, wherein the control device determines the stability of the loading object for each direction based on vibration data when a dummy operation is performed in at least two different directions on the moving body in which the loading object is placed on the loading platform and controls the driving device based on the stability of the loading object in a direction coinciding with a traveling direction of the moving body.

6. A moving body for placing a loading object on a loading platform and transporting the loading object, the moving body comprising:

a driving device configured to move the moving body;

a loading platform lifting and lowering device configured to lift and lower the loading platform; and a control device including a processor configured to control the loading platform lifting and lowering device to lift the loading platform on which the loading object is placed, acquire a parameter related to at least one of a mass, a size, a shape, and a center of gravity of the loading object when the loading platform lifting and lowering device lifts the loading platform on which the loading object is placed, set at least one of speed and acceleration/deceleration of the moving body based on the acquired parameter based on a predetermined relationship, derive a movement path based on an initial position of the moving body and a target position of the moving body, and control the driving device based on at least one of the set speed and the set acceleration/deceleration to move the moving body along the derived movement path.

7. The moving body according to claim 6, wherein the control device determines whether the parameter falls within a predetermined appropriate range, and controls the loading platform lifting and lowering device such that the loading platform becomes low when the parameter does not fall within the appropriate range.

8. The moving body according to claim 6, wherein the control device determines whether the parameter falls within a predetermined appropriate range, and when the parameter does not fall within the appropriate range, lowers the loading object from the loading platform, moves the moving body to a position where the parameter falls within the appropriate range, and then places the loading object on the loading platform again.

9. The moving body according to claim 8, wherein the control device determines whether the parameter falls within the predetermined appropriate range during movement of the moving body.

10. The moving body according to claim 9, wherein in the determination performed during the movement of the moving body, when the parameter does not fall within the predetermined appropriate range, the control device lowers the loading object from the loading platform and causes the moving body to wait for a predetermined time, and then places the loading object on the loading platform again to perform the determination.

* * * * *